UNITED STATES PATENT OFFICE.

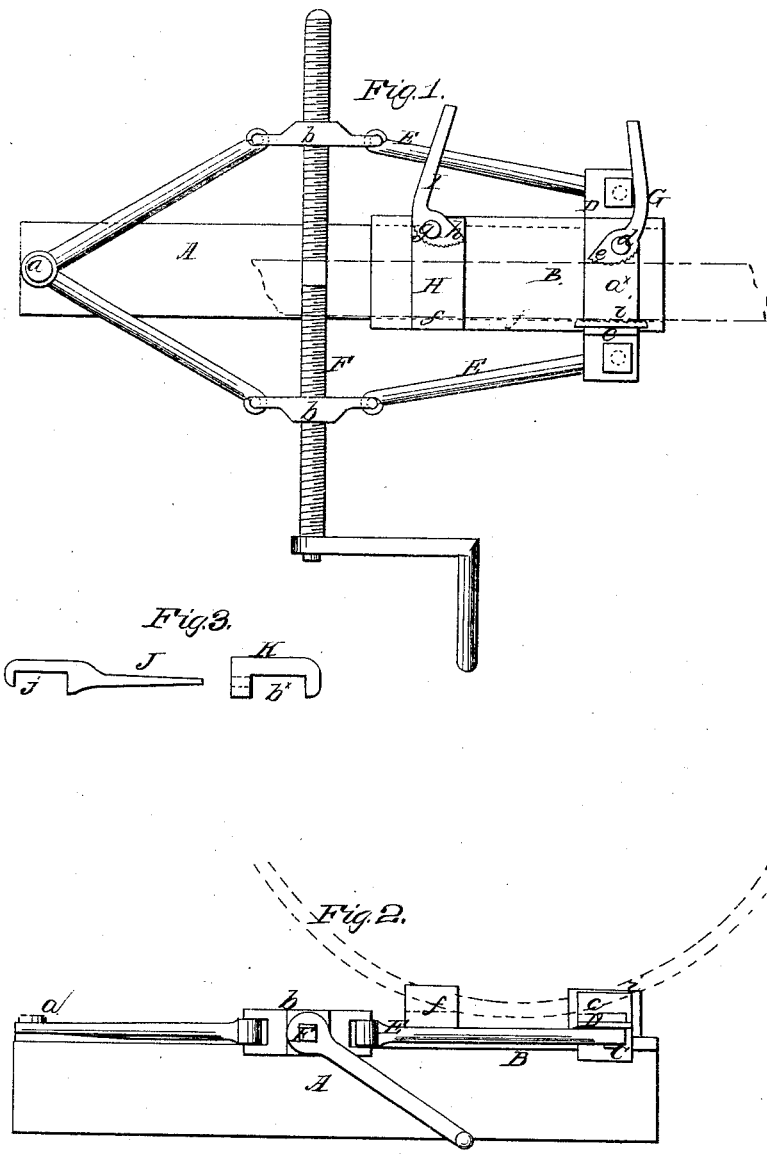

GEORGE McKOWN, OF ALTONA, ILLINOIS.

UPSETTING TIRES.

Specification of Letters Patent No. 27,555, dated March 20, 1860.

*To all whom it may concern:*

Be it known that I, GEORGE MCKOWN, of Altona, in the county of Knox and State of Illinois, have invented a new and Improved Device for Upsetting and Contracting Tires and Also for Punching the Same; and I do hereby declare that the following is a full, clear, and exact description of the same, reference being had to the annexed drawings, making a part of this specification, in which—

Figure 1, is a plan or top view of my invention. Fig. 2, a side view of the same. Fig. 3, a detached view of the parts employed for punching the tires.

Similar letters of reference indicate corresponding parts in the several figures.

The object of this invention is to obtain a simple device for upsetting, contracting and punching tires for wheels, so that the former may be readily made to fit and be secured to the latter without being cut and re-welded.

To enable those skilled in the art to fully understand and construct my invention I will proceed to describe it.

A, represents a base or bar to the upper surface of which at one end a plate B, is secured, the edges of said plate projecting beyond the sides of the base or bar so as to form guides for a plate C, which is placed transversely on the plate B and has its ends bent or curved around and underneath the edges of plate B. To the upper surface of the plate C, a plate D, is attached. This plate D, extends beyond the ends of plate C, and to each end toggles E, E, are connected, the toggles at their opposite ends being attached to the base or bar A, as shown at $a$. Each toggle E, has its arms connected at their inner ends to a nut $b$, and these nuts are fitted on a right and left screw rod F, one nut being fitted on the right and the other on the left screw, as shown clearly in Fig. 1.

On the plate D, a cap-plate $a^x$, is secured, said cap-plate having an upright lip or bearing $c$, secured to it and also a vertical pin $d$, the latter serving as a fulcrum for a lever G, one end of which has an eccentric jaw $e$, formed on it, the jaw being toothed at its face side.

H, is a stationary plate attached to the plate B, and provided with an upright lip or bearing $f$. This plate H, is also provided with a vertical pin $g$, which serves as a fulcrum for a lever I, which has a toothed jaw $h$, at its inner end, the jaw $h$, being similar to jaw $e$, but having a reverse position to it.

The inner sides or surfaces of the lips or bearings $c$, $f$, may be toothed or toothed plates $i$, may be fitted against them. One of these plates $i$, is shown in Fig. 1.

The tire is upset or contracted as follows:—The tire is heated to a proper degree at any desirable point, and the heated portion is placed between the two jaws $e$, $h$, the tire resting perpendicularly on the plates H, $a^x$, and the jaws $e$, $h$, and lips or bearings $c$, $f$, or plates $i$, bearing against the edges of the tire, the levers G, I, being turned so as to bring the toothed surfaces of the jaws in contact with the tire. The screw rod F, is then turned from left to right and the toggles E, will draw the plate D, toward plate H, the jaws $e$, $h$, in consequence of their eccentricity firmly gripping the tire and causing the portion of the same between the two jaws to be upset and contracted as may be required.

In order to accommodate the device to tires of different widths a greater or less number of plates $i$, may be fitted against the lips or bearings $c$, $f$.

In order to punch holes in the tire for the bolts to pass through and secure it to the wheel, a punch J, may be fitted on the cap-plate $a^x$. This punch is shown clearly in Fig. 3, and it will be seen by referring to said figure that the outer part or shank of the punch is formed with a recess $j$, so that the punch may be fitted horizontally on the cap-plate $a^x$.

K, Fig. 3, is a bolster which is also formed with a recess $b^x$, in its under side so that it may be fitted on the plate H. This bolster has a hole as usual to receive the blanks and the end of the punch J. In using the punch, the tire is placed horizontally between the bolster and punch and the latter operated by turning the screw rod F, in the same direction as described for upsetting and contracting the tire.

I do not claim the employment or use of the eccentric jaws $e$, $h$, for firmly grasping the tire for jaws thus arranged have been previously used; but, I do claim as new and desire to secure by Letters Patent, 1. The stationary plate H, provided with an eccentric toothed jaw $h$, and a lip $f$, in connection with a movable or sliding plate D, provided with a cap-plate $a^x$, having an eccentric jaw $e$, and lip $f$, and operated by the toggles E, E, and screw rod F, substantially as and for the purpose set forth.

2. I further claim in connection with the stationary and the sliding plate and operating mechanism above named, the punch J, and bolster K, applied to the plates as and for the purpose set forth.

GEORGE McKOWN.

Witnesses:
 WM. G. BURNESONE,
 SAM. H. LARMINIE.